March 19, 1963 H. R. CHOPE ET AL 3,082,323
RADIATION ANALYSIS
Filed June 25, 1958 3 Sheets-Sheet 1

INVENTORS
HENRY R. CHOPE
ALBERT F. G. HANKEN
By Anthony D. Cennamo

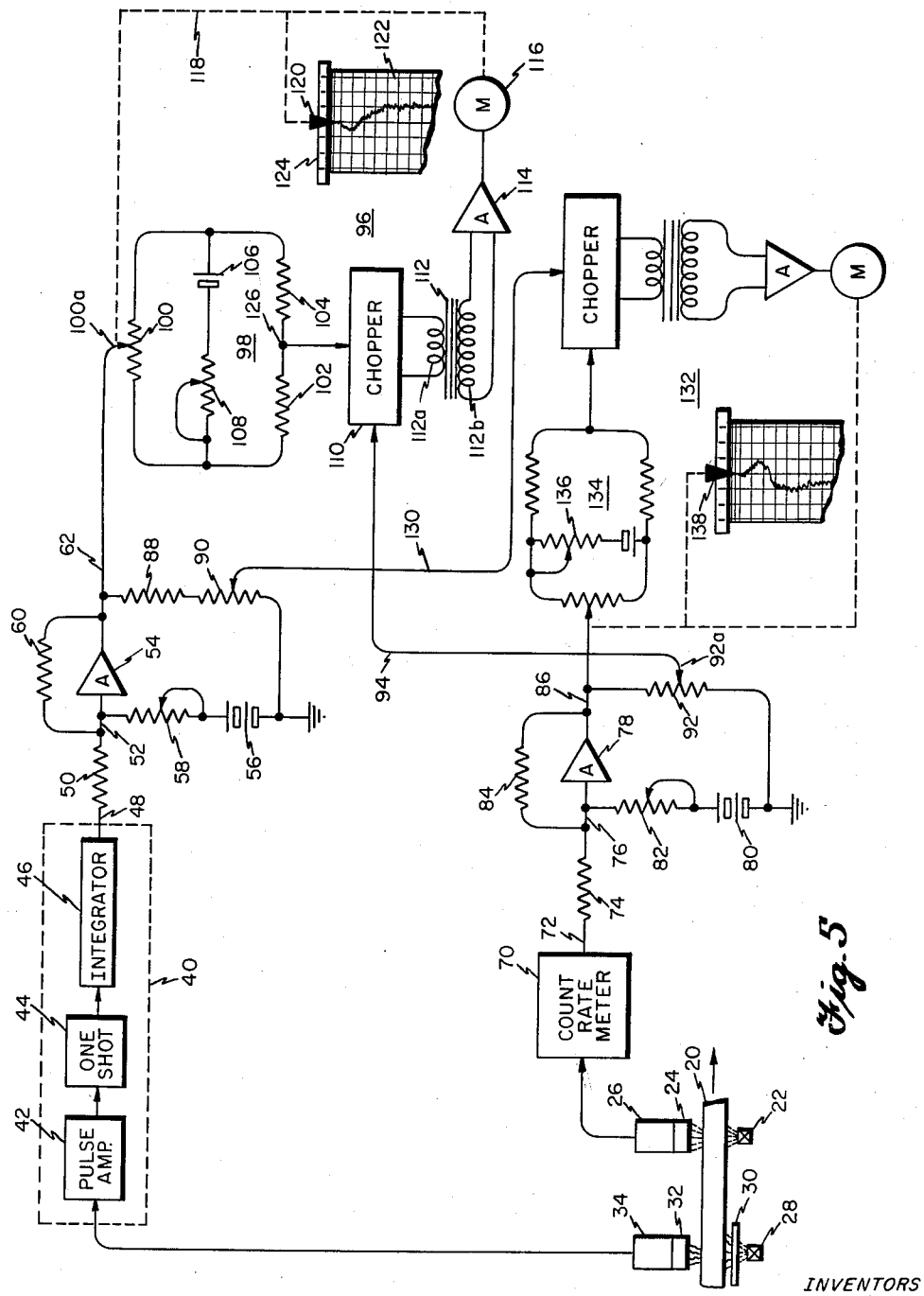

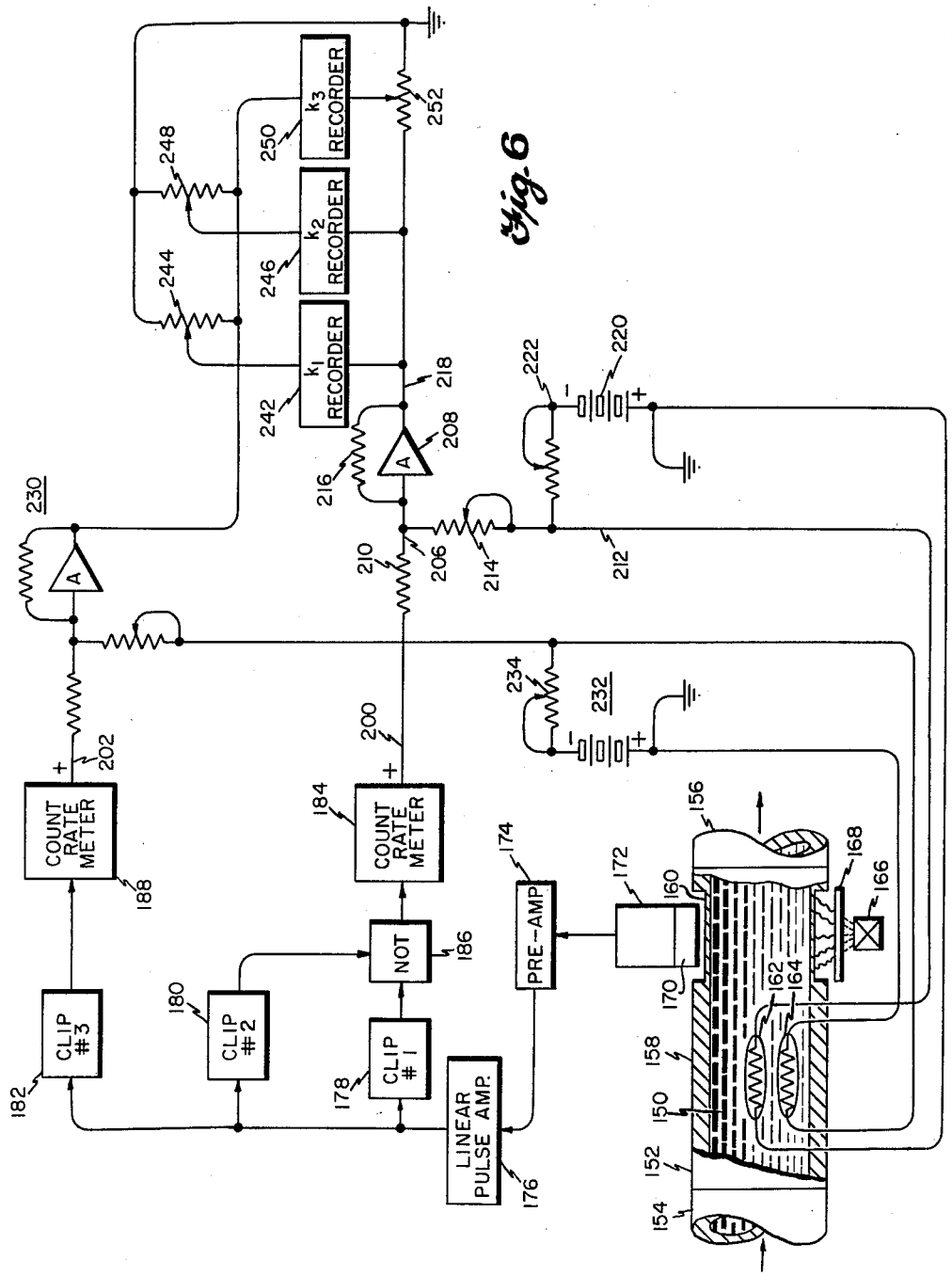

3,082,323
RADIATION ANALYSIS
Henry R. Chope and Albert F. G. Hanken, Columbus, Ohio, assignors to Industrial Nucleonics Corporation, a corporation of Ohio
Filed June 25, 1958, Ser. No. 744,413
11 Claims. (Cl. 259—83.3)

This invention relates to a system for quantitatively analyzing a composite material for specific constituents and/or physical qualities, and more particularly it relates to a method and means for effecting such analysis continuously and automatically in accordance with novel and improved techniques employing radiation absorptiometry.

There are in existence a variety of known systems whereby to a limited extent such analyses have been conducted in the past. However, the systems proposed heretofore have been subject to some rather severe restrictions; preventing the most attractive theoretical advantages of absorptiometric analysis from being realized.

By way of example, in U.S. Patent No. 2,487,797, issued November 15, 1949, to H. Friedman et al., it is proposed that the presence of a foreign constituent in a fluid can be detected qualitatively by observing a change in the amount of penetrative radiation transmitted through a fixed distance in the fluid. The device illustrated therein is stated to be particularly adapted for detection of the presence of water in a hydrocarbon liquid such as gasoline. As an extension of this concept, it is proposed in U.S. Patent No. 2,613,325, issued October 7, 1952, to G. Herzog that radiation absorptiometry may be employed to provide a quantitative indication of the content of one constituent in a fluid containing two known constituents.

It is an even more familiar technique to measure a physical quality of a material, such as the thickness of a solid substance or the density of a fluid. For respective examples, reference can be made to U.S. Patents No. 2,264,725, issued December 2, 1941, to W. E. Shoupp et al., and No. 2,316,231, issued April 13, 1943, to D. G. C. Hare.

The practical measurement of a physical quality in the manner of the art cited, however, has been effected only in the virtual absence of other variable such as composition changes. Similarly the quantitative determination of constituents in mixtures or compounds by the methods referred to has been restricted to binary materials; that is, to mixtures or compounds containing only two constituents.

There are other known techniques of absorptiometry whereby a plurality of constituents in certain materials may be measured. One technique is exemplified by a method of spectrophotometry wherein components of a material are identified by characteristic absorption peaks in the transmitted radiation which occur as the wave length of the radiation is varied over a range of the spectrum. A second technique employs what is referred to as a negative filter analyzer wherein a beam of radiation is split in two parts: the first part passes through a filter which removes a large part of the spectral components characteristically absorbed by the material constituent to be measured and the other part passes through the sample under analysis, whereupon a difference in the measured intensities of the two beams may render a quantitative indication of the constituent contained in the sample. However, the first of these techniques is obviously adapted for laboratory use only, due to the time required for each analysis, during which time the instantaneous composition of a dynamic process stream may be subject to wide variation. While the second technique has been used to provide an "on line" instrument for continuous measurement of a single constituent, the use of this system to analyze for multiple components has been limited to laboratory usage.

In many processing industries, there is a pressing need for instrumentation providing instantaneous and automatic analysis of a flow of material, which instrumentation is not limited in its application to the analysis of a binary material or the measurement of a single physical quality. An instrument thus providing instantaneous and simultaneous readout of a plurality of variables is per se of immediate benefit to the operation of a complex process. Its use over a period of time will allow operating and design personnel to obtain an understanding of the dynamic characteristics of the process which is unattainable by conventional analytical procedures. Furthermore, the availability of a direct measurement of multiple process criteria will create a potential for integrated automatic controls and eventual overall automation of industrial processing plants.

In accordance with this invention, a plurality of radiations having mutually different characteristics are simultaneously directed through a material to be analyzed quantitatively for its specific physical qualities and/or its specific constituents. The radiations penetrating the material are quantitatively and simultaneously detected in mutually discriminatory fashion to provide a plurality of electrical signals. It is found that the variables for which the material is to be analyzed can each be expressed with tolerable accuracy in terms of said signals through the medium of linear simultaneous equations adapted for continuous solution by a special analog computer. The computer in turn may provide an electrical analog output indicating the instantaneous value of each specific physical quality and/or the quantity of each specific constituent of the material. The separate analog outputs may be utilized by any one of a variety of well known methods to provide a continuous recording of each variable, or they may be converted to continuous error signals whereby automatic control of each variable may be effected by suitable motorized adjustments to the processing apparatus.

It is the principal object of the invention to provide a method and means for quantitatively analyzing a composite material for its specific constituents and/or physical qualities.

It is another object to provide means for effecting such analysis continuously and automatically.

It is still another object to provide absorptiometric instrumentation adapted for continuous on-stream analysis of a product material having more than two specific constituents.

It is a further object to provide an instrument for simultaneously and instantaneously rendering quantitative indications of at least one specific physical quality and at least one specific constituent present in a composite material.

It is a still further object to provide an instrument for simultaneously and continuously recording end-point analysis information from which may be deduced dynamic characteristics of complex processes.

It is also an object to provide an instrument adapted to generate suitable control signals for directing the automatic regulation of a plurality of variables in a complex industrial process.

It is an additional object to provide an instrument in accordance with the above objects which is relatively simple and inexpensive to build, which is not excessively difficult to calibrate, which is fully automatic in operation and which requires a minimum of maintenance and adjustment.

Further objects and advantages of the present invention will become apparent in the following detailed description, taken in connection with the appended drawings, in which:

FIG. 5 is a complete schematic showing of a practical analyzer in accordance with one preferred form of the invention.

FIG. 6 is a complete schematic showing of a practical analyzer in accordance with a somewhat different preferred embodiment of the invention.

The present invention basically contemplates the generation and discriminatory detection of multiple radiations having differentiable absorption interactions with different materials, and a computer system utilizing the electrical analog of matrix algebra for processing the detector signals in order to simultaneously solve the general set of $n$ equations:

$$Y_1 = A_{11}S_1 + A_{12}S_2 + \ldots + A_{1n}S_n$$
$$Y_2 = A_{21}S_1 + A_{22}S_2 + \ldots + A_{2n}S_n$$
$$\cdot \quad \cdot \quad \cdot \quad \cdot \quad \cdot$$
$$Y_n = A_{n1}S_1 + A_{n2}S_2 + \ldots + A_{nn}S_n$$

for $n$ unknown constituents and/or physical qualities $y$ of a composite material.

Figure 1:
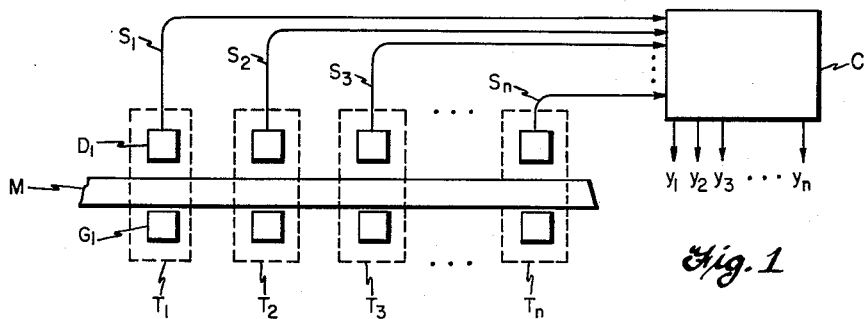
FIG. 1 is a generalized showing of an analyzer in accordance with the invention.

This general situation is exemplified by FIG. 1, wherein there is illustrated a composite material M undergoing analysis in accordance with the invention.

It is seen that the analyzer may include a plurality of transducers $T_1$ to $T_n$. Each of these transducers, as at $T_1$, preferably comprises a radiation generator, as at $G_1$, disposed on one side of the material and a radiation detector, as at $D_1$, located on the opposite side of the material. Each generator is adapted to produce a stabilized flux of a radiation selected in accordance with a desired mode of absorption interaction with the various constituents of the composite material M. Each of the radiation detectors is adapted to generate an electrical signal on an output line, as at $S_1$, indicating the intensity of that radiation (from its associated radiation generator), which has penetrated the material M.

The signals on lines $S_1$ to $S_n$ are connected to a computer C having a plurality of electrical outputs $Y_1$ to $Y_n$ which correspond to $Y_1$ to $Y_n$ in the general equations above. Each output comprises an electrical analog indicating the quantitative value of one of the known physical qualities and/or the qauntity of a particular constituent present in the composite material M.

Figure 2:
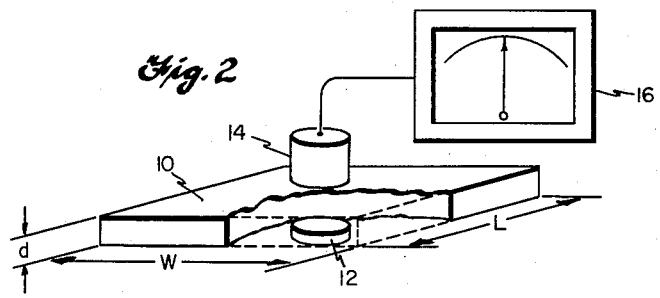
FIG. 2 is a showing of an absorptiometric gauging apparatus illustrating certain basic concepts in order to facilitate an understanding of the principles of the invention.

Referring now to FIG. 2, consider a material M occupying a space bounded by a rectangular solid 10 having a length L, a width W and a thickness $d$. This material sample is placed between a radiation source 12 and a radiation detector 14. It is assumed that the source and detector are respectively contiguous to the two opposite sides of the material so that all attenuation of the radiation beam projected from the source to the detector occurs within the limits of the distance $d$. In practice there may be small air gaps or other extraneous absorbers present, which, however, may be neglected as will appear hereinafter.

Connected to the detector 14 there is shown an instrument 16 which indicates the intensity of radiation impinging on the detector. Assuming that the detector 14 and the indicator 16 function in the ideal manner, the readings of the indicator with and without the radiation absorbing sample 10 in place are related by the classic equation $$I = I_0 e^{-\mu x} \quad (1)$$

where

I represents the indicator reading with the absorber 10 in place;

$I_0$ represents the original indicator reading without the absorber;

$e$ is the Napierian base of natural logarithms;

$\mu$ is the mass absorption coefficient of the material M in the sample 10 for the particular radiation employed and the particular source and detector geometry employed in the apparatus, and $x$ represents the mass per unit area of the absorber.

Examining the nature of the quantity $x$, the mass $m$ of the total sample is proportional to the density $\rho$ of the material M and is given by $$m = \rho dWL$$

The area A of the upper or lower surface of the sample 10 is given by $$A = WL$$

whence $$x = \frac{m}{A} = \rho d \quad (2)$$

independently of the length and width dimensions.

Now if $x$ is changed by an increment $\Delta x$ the response of the indicator becomes $$I + \Delta I = I_0(e^{-\mu(x+\Delta x)}) \quad (3)$$

and the corresponding change in indicator response is $$\Delta I = I_0(e^{-\mu(x+\Delta x)} - e^{-\mu x})$$

obtained by subtracting Equation 1 from Equation 3.

The last equation may be rewritten as $$\Delta I = I_0(e^{-\mu x})(e^{-\mu \Delta x}) - e^{-\mu x}$$

or by factoring $$\Delta I = I_0 e^{-\mu x}(e^{-\mu \Delta x} - 1)$$

and substituting I from Equation 1 for the first two factors in the last expression, it becomes $$\Delta I = I(e^{-\mu \Delta x} - 1) \quad (4)$$

In accordance with Maclaurin's series, $$e^{-\mu \Delta x} = 1 - \mu \Delta x + \frac{\mu^2(\Delta x)^2}{2!} - \frac{\mu^3(\Delta x)^3}{3!} + \ldots + \frac{(-\mu \Delta x)^{n-1}}{(n-1)!}$$

Since the values of the second and higher order terms in this series approach zero for small values of $\Delta x$, they may be neglected, so that $$e^{-\mu \Delta x} \approx 1 - \mu \Delta x$$

and Equation 4 becomes $$\Delta I \approx -I \mu \Delta x$$

By arranging this expression so that all values obtainable from the indicator 16 are on one side of the equation, $$-\frac{\Delta I}{I} \approx \mu \Delta x \quad (5)$$

The foregoing mathematical analysis describes and justifies a well-known and eminently successful empirical method of radiation absorptiometry. This empirical method will now be reviewed in the light of this mathematical analysis in order that the more complex empirical method of the present invention may be comprehensibly justified by the more complex analysis thereof.

Figure 3:
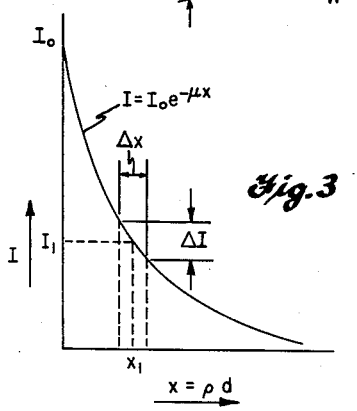
FIG. 3 is a graphical showing of certain characteristics of the apparatus of FIG. 2.

Referring to FIG. 3, there is graphically illustrated the familiar absorptiometric function given by Equation 1. In practice such a curve is obtained empirically by plotting the indicated detector response I against the weighed and measured value of weight per unit area $x$ for a full range of values of $x$ represented by a plurality of samples of the material M.

It is apparent from FIG. 3 and Equation 2 that a thickness gauge as exemplified by the above-mentioned apparatus of Shoupp et al. and a density gauge as exemplified by the apparatus of Hare, cited, are basically identical; the only distinction being that in the thickness gauge the density $\rho$ is held substantially constant by the uniform physical state of the measured solid and conversely in the fluid density gauge the distance $d$ (thickness) is held constant by the constraining walls of the container.

The industrial user of a radiation thickness gauge or density gauge employs the same almost exclusively for on-line or on-stream measurement of a continuously formed product, and hence the only essential requirement of the instrument is that it be able to measure accurately and with good resolution over a relatively small range of values $\Delta x$ which ordinarily amounts to a deviation of only a few percent from some specification value $x_1$ of weight per unit area or volume. Accordingly, in a practical gauge the response of the radiation detector is converted to a signal voltage representing the variable I, and to this voltage there is continuously added a constant second voltage proportionally representing the negative value of $I_1$ which corresponds on the graph to $x_1$. The electrical sensitivity of the indicator 16 utilizing the resulting combined signal $|I-I_1|$ is then adjusted so that a full scale deflection of the meter obtains for a signal change $\Delta I$.

Figure 4:
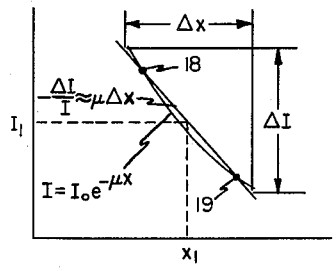
FIG. 4 is an enlargement of a portion of FIG. 3 showing additional details of the characteristics illustrated in FIG. 3.

The result of this electrical manipulation is shown in FIG. 4, which is an enlargement of the curve of FIG. 3 over the range $\Delta I = f(\Delta x)$. It is seen that the electrical sensitivity adjustment to the meter indication performs the multiplication $(1/I_1)\Delta I$, and that the chosen value of the voltage representing $I_1$ selects a particular linear relation from the family thereof inherent in Equation 5. Thus the exponential curve given by Equation 1 is approximated by a straight line given by Equation 5. Best overall accuracy is obtained when the line is placed so as to intersect the curve at two points 18 and 19. The error introduced by the approximation is represented in magnitude and direction by the horizontal distance from the curve to the line, so that in the central portion of its linear scale the indicator 16 reads out a slightly too-large value of $x$, and at the end portions of the scale the readings are slightly deficient. However, it is found that if $\Delta x$ is restricted to a range of, say, ten percent of $x_1$, this error will not amount to more than a fraction of one percent, which is entirely satisfactory for industrial purposes. Accordingly a very versatile absorptiometric gauging instrument can be provided utilizing simple and reliable electronic circuitry, preferably such as is described in U. S. Patent No. 2,829,268, issued April 1, 1958, to Henry R. Chope.

Various illustrative embodiments of the present invention may now be described. Referring to FIG. 5, there is shown a solid material 20 which is a composite of two materials $M_1$ and $M_2$. For example, the material 20 may consist of a traveling polyethylene sheet $M_1$ incorporating about ten percent by weight of a coloring compound $M_2$ comprising one or more metallic salts. It is desired to simultaneously obtain continuous measurements of the weight per unit area of the total sheet 20 and the weight per unit area of coloring compound contained therein.

In accordance with one form of this invention, a first radiation source 22 and a first radiation detector are disposed in the conventional fashion on opposite sides of the sheet 20. For purposes of illustration the source 22 comprises a sealed capsule containing a suitable $\beta$-ray emitter radioisotope and the detector comprises a scintillation crystal 24 and associated photomultiplier tube 26.

Adjacent to the first source and detector combination there is placed a second combination in which by way of illustration the radiation source comprises a $\beta$-ray emitter 28 and a target 30 of sufficient thickness to absorb about ninety-eight percent of the $\beta$-rays emanating from the capsule 28 which impinge on the target. A portion of the energy of the $\beta$-rays is thus converted in the target 30 to X-radiation which is directed through the sheet 20 to the second detector. The second detector may comprise a second scintillation crystal 32 and a second photomultiplier 34.

For the X-rays emanating from target 30, the polyethylene has a mass absorption coefficient $\mu_1$ and the coloring compound has a coefficient $\mu_2$. For the $\beta$-rays emitted from the source 22 the polyethylene has a mass absorption coefficient $\mu_3$ and the coloring compound has a coefficient $\mu_4$, so that $\mu_4 > \mu_3 > \mu_2 > \mu_1$ Letting $x_1$ = weight per unit area of polyethylene
$x_2$ = weight per unit area of coloring compound
$x_1 + x_2 = x$ = the total weight per unit area of the sheet 20;

in accordance with Equation 1 the intensity of the radiation $I_1$ impinging on the crystal 32 and registered by the photomultiplier 34 is given by $$I_1 = I_{10} \exp{-(\mu_1 x_1 + \mu_2 x_2)}$$

where $I_{10}$ is the initial radiation intensity without the sheet 20 in place, since the total radiation absorption is the product of the absorption by the two materials $M_1$ and $M_2$. Similarly, for the $\beta$-source 22 and detector $$I_2 = I_{20} \exp{-(\mu_3 x_1 + \mu_4 x_2)}$$

Converting the last two equations to the form of Equation 5

$$\frac{-\Delta I_1}{I_1} \approx \mu_1 \Delta x_1 + \mu_2 \Delta x_2 \tag{6}$$

and $$\frac{-\Delta I_2}{I_2} \approx \mu_3 \Delta x_1 + \mu_4 \Delta x_2 \tag{7}$$

whence $$\Delta x_1 \approx a \Delta I_2 - b \Delta I_1$$
$$\Delta x_2 \approx c \Delta I_1 - d \Delta I_2 \tag{8}$$

and $$\Delta x = \Delta x_1 + \Delta x_2 \approx (c-b)\Delta I_1 + (a-d)\Delta I_2 \tag{9}$$

wherein $$a = \frac{\mu_2}{I_2(\mu_1 \mu_4 - \mu_2 \mu_3)} \quad b = \frac{\mu_4}{I_1(\mu_1 \mu_4 - \mu_2 \mu_3)}$$

$$c = \frac{\mu_3}{I_1(\mu_1 \mu_4 - \mu_2 \mu_3)} \quad d = \frac{\mu_1}{I_2(\mu_1 \mu_4 - \mu_2 \mu_3)}$$

Referring again to FIG. 5, the output of the photomultiplier 34 is connected to a count rate meter shown enclosed by the dotted line 40. The count rate meter 40, which may be of known construction, may include a pulse amplifier 42, a one-shot multivibrator 44 and a pulse integrating circuit 46. The output of the integrator 46 on line 48 is a voltage proportional to the quantity $I_1 + \Delta I_1$. This voltage is connected through resistor 50 to the input 52 of an operational amplifier 54. A further input to the amplifier is provided by a reference voltage source represented by the battery 56 which is connected to input 52 through a rheostat 58. A feedback resistor 60 connects the output 62 of amplifier 54 to the input 52 thereof so as to maintain the input at substantially zero potential.

In a similar manner the output of photomultiplier 26 is connected to a count rate meter 70 similar to the meter 40 and the output of the meter 70 on line 72 is connected through a resistor 74 to the input 76 of an operational amplifier 78. A voltage source represented by the battery 80 is also connected through a rheostat 82 to the input 76. A feedback resistor 84 connects the output 86 of amplifier 78 to the input 76 thereof.

In Equations 6 and 7 it will be noted that $I_1$ and $I_2$ are parameters which must be specified in the same manner that I in Equation 5 was specified as $I_1$ in order to select the particular function represented by the straight line on the graph of FIG. 3. Accordingly in the calibration of the instrument shown in FIG. 5, a value $I_{11}$ will be selected for the parameter $I_1$ in Equations 6 and 7 and similarly a value $I_{21}$ will be selected for parameter $I_2$. Thereupon the quantities $a$, $b$, $c$ and $d$ in Equations 8 and 9 become constants, since they are products of $I_{11}$ and $I_{21}$ and the absorption coefficients.

In calibrating the instrument, rheostat 58 is set so that when a voltage $V_{11}$ corresponding to a radiation intensity $I_{11}$ appears on line 48, the voltage at the output 62 of amplifier 54 is zero. Assuming that the open loop gain of the amplifier is practically infinite, then $$V_{11} = \frac{R_{60}}{R_{50}} - V_{56}\frac{R_{60}}{R_{58}} = 0$$

wherein $V_{56}$ = voltage output of battery 56
$R_{60}$ = resistance of resistor 60
$R_{50}$ = resistance of resistor 50
$R_{58}$ = resistance of resistor 58

If now the voltage $V_1$ changes by an increment $\Delta V_1$ when the radiation intensity changes to $I_{11} + \Delta I_1$, the amplifier output becomes $$\Delta V_1 \frac{R_{60}}{R_{50}} \propto \Delta I_1$$

In a similar manner the rheostat 82 is calibrated so that when a voltage $V_{21}$ corresponding to a radiation intensity $I_{21}$ appears on line 72, $$V_{21}\frac{R_{84}}{R_{74}} - V_{80}\frac{R_{84}}{R_{82}} = 0$$

and $$\Delta V_2 \frac{R_{84}}{R_{74}} \propto \Delta I_2$$

will appear at the output 86 of the amplifier 78 when a change $\Delta I_2$ in the radiation intensity causes a change $\Delta V$ in the voltage on line 72.

Thus analog voltages representing $\Delta I_1$ and $\Delta I_2$ in Equations 8 and 9 are made available respectively on lines 62 and 86.

Examining the constants in Equation 8, it is seen that the magnitude of $d$ is almost directly correlated with $\mu_1$, the smallest absorption coefficient, whereas $c$ is correlated with $\mu_3$, a considerably larger coefficient. It thus appears that $\Delta x_2 \approx f(\Delta I_1)$ with a small correction being required for changes in $\Delta I_2$.

Also it is seen that in Equation 9 the difference between $b$ and $c$ is directly proportional to the difference between $\mu_3$ and $\mu_4$ which are almost identical, $b$ being larger than $c$, so that $(c-b)$ is a very small negative quantity. The difference between $a$ and $d$ is directly proportional to the difference between $\mu_2$ and $\mu_1$, and since $\mu_2 > \mu_1$, $(a-d)$ is an appreciably large positive quantity. It is therefore apparent that $\Delta x \approx f(\Delta I_2)$ with a small correction for changes in $\Delta I_1$. Equations 8 and 9 may therefore be rewritten respectively as $$\frac{1}{c}\Delta x_2 = \Delta I_1 - \frac{d}{c}\Delta I_2 \qquad (10)$$

and $$\Delta x = \frac{1}{a-d}\Delta x = \Delta I_2 - \frac{b-c}{a-d}\Delta I_1 \qquad (11)$$

In the computer of FIG. 5, the analog voltage on line 62, representing $\Delta I_1$, appears across a voltage divider consisting of a resistor 88 and a variable potentiometer 90. Similarly the analog voltage on line 86, representing $\Delta I_2$, appears across a potentiometer 92.

In order that the system may be adapted to solve Equation 10, the variable tap 92a of potentiometer 92 is adjusted so that the voltage obtained from the tap is proportional to $$\frac{d}{c}\Delta I_2$$

This voltage is fed over line 94 to a recorder 96 which is also connected to line 62. The difference between the two voltages represents $$\frac{1}{c}\Delta x_2$$

The recorder 96 is preferably of the servo rebalancing potentiometer type. Basically it may include a bridge network 98 having a slidewire potentiometer 100 in one arm and a pair of precision resistors 102 and 104 in the other arm. The bridge is energized by a voltage source represented by a battery 106 having a rheostat 108 in circuit therewith for adjusting the potential across the slidewire 100. Line 94 is connected directly to one input terminal of a conventional chopper 110, and line 62 is connected through the bridge circuit 98 to the other input terminal thereof. The circuit of the chopper includes the primary winding 112a of a coupling transformer 112 whose secondary winding 112b is connected to the input of an A.C. servo amplifier 114. The output of the servo amplifier is connected to a two-phase servo motor 116 which drives the variable tap 100a of the slidewire 100 through a mechanical connection indicated by the dotted line 118. The motor also drives the pen and pointer mechanism 120 whereby an indication is registered on a chart 122 relative to a graduated scale 124.

It is seen that in this well-known recorder arrangement the voltage output of the bridge circuit appearing between point 126 and the tap 100a of the slidewire is automatically maintained equal and opposite to the difference between the voltages on lines 62 and 94. Whenever an unbalance occurs so that the sum of the three voltages is not zero, a current flows in the chopper circuit and the chopper converts the same to an alternating current in the primary winding 112a of transformer 112. Accordingly the amplifier 114 will have an output characterized by one of two directly opposite phases, depending on the direction of the current through the chopper 110. This output will actuate the servo motor 116 in the proper direction to readjust the slidewire 100a until a balance again obtains.

Since the voltage output of the bridge circuit 98 is maintained equal to the difference between the voltages on lines 62 and 94, the bridge output is the electrical analog of the quantity $$\frac{1}{c}\Delta x_2$$

in Equation 10. The bridge sensitivity rheostat 108 determines the amount of slidewire movement required to provide a given increment of voltage output from the bridge 98, and thus determines the amount of indicator 120 movement for a given change in $$\frac{1}{c}\Delta x_2$$

Therefore, by a proper calibration setting of rheostat 108, the translation of bridge voltage into indicator movement multiplies the bridge voltage by the constant $c$ so that the indicator 120 registers $\Delta x_2$, the solution of Equation 8.

Equation 11 is solved in a similar manner. The calibration setting of potentiometer 90 multiplies the voltage on line 62, representing $\Delta I_1$, by the constant $$\left(\frac{b-c}{a-d}\right)$$

so that the voltage on line 130, connected to the tap of the potentiometer, is the analog of $$\frac{b-c}{a-d}\Delta I_1$$

This voltage and the voltage on line 86, representing $\Delta I_2$, are fed into a recorder 132 structurally identical with recorder 96, having a bridge circuit 134 whose voltage output is maintained equal and opposite to the difference between the voltages on lines 86 and 130. The voltage output of the bridge is therefore the electrical analog of the quantity $$\frac{\Delta x}{a-d}$$

With a proper calibration setting of a sensitivity rheostat 136 in the bridge 134, the bridge voltage is translated into a movement of a recorder indicator 138 which is multiplied by the constant $(a-d)$ so that the indicator 138 continuously registers $\Delta x$, the solution of Equation 9.

Referring again to FIG. 1, consider the case where the homogeneous material M occupying the space 10 between the source 12 and detector 14 is replaced by a material having three constituents $M_1$, $M_2$ and $M_3$. In this case it is more convenient to express the quantity present of each material as a volume fraction. If the total volume V of the material is $$V = dWL$$

and the volume of material $M_1$ is $V_1$, the volume fraction of material $M_1$ is $$\frac{V_1}{V} = k_1$$

Accordingly, the thickness or volume fractions of the three materials $M_1$, $M_2$ and $M_3$ are defined as $k_1$, $k_2$ and $k_3$.

The use of volume fractions is particularly useful in dealing with composite fluids, for example, a homogeneous mixture of fluids $M_1$, $M_2$ and $M_3$. In this case the fluid $M_1$ is uniformly dispersed throughout the entire volume.

$$V = dWL$$

and accordingly its effective density in the mixture is given by the product $(\rho_1 k_1)$. The same is true for the other two materials. In accordance with Equations 1 and 2

$$I = I_0 \exp -(\mu_1\rho_1 k_1 + \mu_2\rho_2 k_2 + \mu_3\rho_3 k_3)d \quad (12)$$

Following the procedure of the cases described hereinabove, it is now desired to convert Equation 12 to the form of Equation 5 by replacing the quantity $x$ appearing therein by the quantity $(\rho k)d$. In the case of the fluid, the distance $d$ will be held constant as in the case of the density gauge. However, as a practical matter, in the case of the fluid another variable is introduced since the density of the fluid changes significantly with temperature. This is in contrast with the case of the solid material whose small temperature coefficient of expansion was appropriately neglected. Accordingly Equation 5 must take the form $$-\frac{\Delta I}{I} \approx \mu d \Delta(\rho k)$$

Under the conditions which permit Equation 5 to replace Equation 1

$$\Delta \rho k \approx \rho \Delta k + k \Delta \rho$$

whereupon Equation 12 may be expressed in the form of Equation 5 as follows:

$$-\frac{\Delta I}{I} \approx (\mu_1\rho_1\Delta k_1 + \mu_2\rho_2\Delta k_2 + \mu_3\rho_3\Delta k_3)d$$
$$+ (\mu_1 k_1 \Delta \rho_1 + \mu_2 k_2 \Delta \rho_2 + \mu_3 k_3 d_3 \rho_3)d$$

This equation may be rewritten as $$-\frac{\Delta I}{dI} \approx \mu_1\rho_1 \Delta k_1 + \mu_2\rho_2 \Delta k_2 + \mu_2\rho_2 \Delta k_2$$
$$+ \frac{1}{d}\left( \mu_1 k_1 d_1 \rho_1 \frac{\Delta \rho_1}{\rho_1} + \mu_2 k_2 d_2 \rho_2 \frac{\Delta \rho_2}{\rho_2} + \mu_3 k_3 d_3 \rho_3 \frac{\Delta \rho_3}{\rho_3} \right)$$
$$(13)$$

Considering the minor terms in the second part of the last equation, it is seen that each contains a factor $$\frac{\Delta \rho}{\rho}$$

which can be related to the expansion of a specific fluid, having a nominal density $\rho$, brought about by a temperature change $\Delta t$ so that $$\frac{\Delta \rho}{\rho} = -\beta \Delta t$$

where $\beta$ represents the cubic expansion coefficient and $\Delta t$ the change in the temperature of the fluid.

For most fluids $\beta$ has a value on the order of $10^{-3}$. An exception obtains in the case of water whose $\beta$ $10^{-4}$ can be neglected in practical measurements. In the case of other fluids only an insignificant error is introduced by substituting a weighted average value of $\beta$ for each of the slightly different expansion coefficients of the individual constituents of the normal composite fluid. It is thus permissible to employ the approximation $$\frac{\Delta \rho_1}{\rho_1} \approx \frac{\Delta \rho_2}{\rho_2} \approx \frac{\Delta \rho_3}{\rho_3} = -\beta \Delta t$$

The expression $$d(\mu_1 k_1 \rho_1 + \mu_2 k_2 \rho_2 + \mu_3 k_3 \rho_3) = \zeta$$

which may thereupon be factored out of the second major term of Equation 13 is a constant representing a particular mixture of fluids $M_1$, $M_2$ and $M_3$, having selected volume fractions of each fluid, and being disposed between a source and detector separated by a fixed distance $d$. That is to say, $\zeta$ merely represents a particular value of $(\mu x)$ in Equation 1 which is selected in accordance with the normal composition of the mixture to be measured, and which specifies a nominal value for I in Equation 13. To obtain best resolution, in practice it is desirable to fix the distance $d$ so that $\zeta$ is approximately equal to one "relaxation length"; that is, so that $$\zeta = 1$$

hence $$e^{-\mu x} = e^{-\zeta} = e^{-1}$$

and from Equation 1

$$I = \frac{I_0}{e}$$

Equation 13 may be rewritten as $$-\frac{\Delta I}{I} \approx \mu_1 \rho_1 \Delta k_1 + \mu_2 \rho_2 \Delta k_2 + \mu_3 \rho_3 \Delta k_3 + \frac{1}{d}(-\zeta \beta \Delta t)$$

or $$\frac{1}{dI}(I\zeta\beta\Delta t - \Delta I) \approx \mu_1\rho_1\Delta k_1 + \mu_2\rho_2\Delta k_2 + \mu_3\rho_3\Delta k_3 \quad (14)$$

Referring now to FIG. 6, there is shown an apparatus for continuous measurement of a fluid having the three constituents $M_1$, $M_2$ and $M_3$, nominally present in the respective volume fractions $k_1$, $k_2$ and $k_3$. The fluid 150 enters the detector head 152 through an inlet pipe 154 and exits through an outlet pipe 156.

The detector head includes a conduit 158 having a thin wall section 160 to permit the passage of radiation through the fluid 150 with a minimum of attenuation by the walls of the conduit. Upstream of the thin wall portion, a pair of temperature compensating resistance elements 162 and 164 are immersed in the fluid flow in a manner to facilitate rapid temperature exchange therewith. On one side of the thin wall section 160 is placed a source 166 of $\beta$-radiation. A target 168, which converts a portion of the $\beta$-radiation to X-rays, is disposed between the source 166 and the conduit section 160.

The X-rays penetrating the fluid 150 and the pipe section 160 are detected by means of a scintillation crystal 170 and photomultiplier 172 combination. The output of the photomultiplier is coupled via an impedance matching preamplifier 174 to a linear pulse amplifier 176. The output of the pulse amplifier is connected to three discriminator circuits or clippers, 178, 180 and 182.

Pulses passing the first clipper 178 are applied to a count rate meter 184 through a transmission path which includes a NOT gate or anticoincidence circuit 186 which is gated by pulses passing the second clipper 180. Pulses passing the third clipper 182 go directly to the input of a second count rate meter 188.

Figure 7:
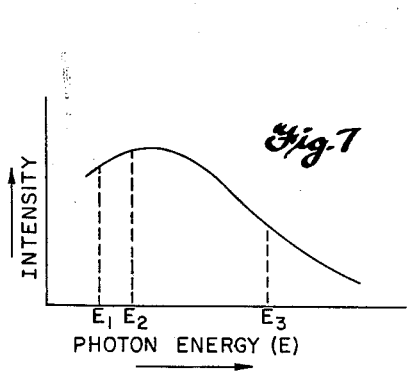
FIG. 7 is a graph showing certain characteristics of the radiation source employed in the apparatus of FIG. 6.
Figure 8:
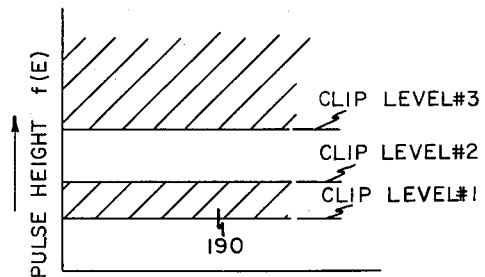
FIG. 8 is a diagram illustrating the setting of pulse height discriminator circuits employed in the apparatus of FIG. 6.

The function of the clippers and the NOT gate is clarified by FIGS. 7 and 8. Referring to FIG. 7 there is shown a plot relating photon energy of the X-rays emanating from target 168 to the intensity or radiation flux of rays having discrete energies. It is seen that a continuous spectrum of wave lengths is generated, said spectrum being a composite of a major portion of bremsstrahlung radiation and a minor portion of fluorescent radiations characteristic of the atoms in the target 168.

X-rays in the range of energies around $E_1$ and $E_2$ are absorbed in the fluid 150 almost entirely by the photoelectric interaction mode whereas at higher energies in the vicinity of $E_3$, absorption in the Compton scattering mode begins to prevail.

As is known, the scintillation detector originates pulses whose amplitude is proportional to the energy of the photons interacting with the crystal 170. Referring to FIG. 8, it is seen that clipper 178 is adjusted so as to block all pulses below clip level #1 and to pass all pulses of greater amplitude. Similarly, clipper 180 blocks pulses below, and passes pulses above, clip level #2. Therefore the count rate meter 184 registers all pulses higher than level #1 but not higher than level #2, due to the blocking action of the NOT gate 186. That is, the meter circuit registers pulses in the shaded area 190 which corresponds to a "slit" $E_1-E_2$ in the X-ray spectrum of FIG. 7 hereinafter referred to as the first channel.

A similar slit in the spectrum in the vicinity of energy $E_3$ may be employed; however, an equally satisfactory and less expensive arrangement as shown employs in the second channel all radiations having energies greater than $E_3$ and providing pulses higher than clip level #3.

In most cases, the first channel radiation energy selected is in the photoelectric region of 15–80 kev., and the second is in the transition region for the high atomic number constituents of the mixture; that is, in the range of 50–200 kev.

Thus it is seen that the single source and detector combination of FIG. 6 may be employed to obtain about the same result as the two source and detector systems of FIG. 5.

For the two radiations, two equations may be written in the form of Equation 14 as follows:

$$\frac{1}{dI_1}(I_1\zeta_1\beta\Delta t - \Delta I) \approx \mu_1\rho_1\Delta k_1 + \mu_2\rho_2\Delta k_2 + \mu_2\rho_2\Delta k_2$$

$$\frac{1}{dI_2}(I_2\zeta_2\beta\Delta t - \Delta I) \approx \mu_4\rho_1\Delta k_1 + \mu_5\rho_2\Delta k_2 + \mu_6\rho_3\Delta k_3$$

A third equation $$0 = \Delta k_1 + \Delta k_2 + \Delta k_3$$

is provided by the fact that the total volume of fluid confined in the conduit between the source and detector must remain constant, so that one volume fraction can increase only at the expense of one or both of the other volume fractions. In these equations $\mu_1$, $\mu_2$ and $\mu_3$ represent the mass absorption coefficients of the three constituents $M_1$, $M_2$ and $M_3$ respectively for radiation in the first channel, and $\mu_4$, $\mu_5$ and $\mu_6$ similarly represent the coefficients of the respective materials for radiation in the second channel.

The solution of these equations is:

$$\Delta k_1 \approx \frac{c_1}{dI_1}(I_1\zeta_1\beta\Delta t - \Delta I_1) - \frac{c_2}{dI_2}(I_2\zeta_2\beta\Delta t - \Delta I_2)$$

$$\Delta k_2 \approx \frac{c_3}{dI_1}(I_1\zeta_1\beta\Delta t - \Delta I_1) - \frac{c_4}{dI_2}(I_2\zeta_2\beta\Delta t - \Delta I_2)$$

$$\Delta k_3 \approx \frac{c_5}{dI_1}(I_1\zeta_1\beta\Delta t - \Delta I_1) - \frac{c_6}{dI_2}(I_2\zeta_2\beta\Delta t - \Delta I_2)$$

wherein $c_1-c_6$ are constants involving terms and products of the various absorption coefficients as was the case with constants $a$, $b$, $c$ and $d$ described more fully in the analysis of the system of FIG. 5 given hereinabove.

Assume that the detector head conduit in FIG. 6 contains a "normal" composition of fluid at a nominal temperature. Then $I_1$ in the last set of equations will have a value $I_{11}$ and $I_2$ will have a value $I_{21}$. A voltage $V_{11}$ corresponding to $I_{11}$ will appear on line 200 at the output of the first channel count rate meter 184 and a second voltage $V_{21}$ will appear on line 202 at the output of the second channel count rate meter 188.

As a result of a change in the composition of the fluid, an increment $\Delta I_{1c}$ will be added to $I_{11}$, and if a change in temperature $\Delta t$ also occurs, another increment $I_{11}\zeta_1\beta\Delta t$ will be added simultaneously so that the first-channel radiation impinging on the detector becomes $$I_{11} + \Delta I_{1c} + I_{11}\zeta_1\beta\Delta t = I_{11} + \Delta I_1$$

and a corresponding voltage $$V_{11} + \Delta V_{1c} + V_{11}\zeta_1\beta\Delta t = V_{11} + \Delta V_1$$

will appear on line 200. Similarly a voltage $$V_{21} + \Delta V_{1c} + V_{21}\zeta_2\beta\Delta t = V_{21} + \Delta V_2$$

corresponding to the radiation $$I_{21} + \Delta I_{2c} + I_{21}\zeta_2\beta\Delta t = I_{21} + \Delta I_2$$

detected in the second channel will appear on line 202.

Expressed in terms of their voltage analogs, therefore, the solutions given above for the volume fractions $\Delta k_1$, $\Delta k_2$ and $\Delta k_3$ are as follows:

$$\Delta k_1 \approx \frac{c_1}{dV_{11}}(s_1) - \frac{c_2}{dV_{21}}(s_2) \qquad (15)$$

$$\Delta k_2 \approx \frac{c_3}{dV_{11}}(s_1) - \frac{c_4}{dV_{21}}(s_2) \qquad (16)$$

$$\Delta k_3 \approx \frac{c_5}{dV_{11}}(s_1) - \frac{c_6}{dV_{21}}(s_2) \qquad (17)$$

wherein:

$$s_1 = V_{11}\zeta_1\beta\Delta t - \Delta V_1 = V_{1c}$$
$$s_2 = V_{21}\zeta_2\beta\Delta t - \Delta V_2 = V_{2c}$$

Obviously the voltage signals $s_1$ and $s_2$ will represent changes in the voltage outputs of count rate meters 184 and 188 respectively, which voltage changes are due entirely to composition changes in the fluid 150.

The signal $s_1$ may be obtained from the voltage $$(V_{11} + \Delta V_1)$$

appearing on line 200 by subtraction $$s_1 = (V_{11} + \Delta V_1) - (V_{11} + V_{11}\zeta_1\beta\Delta t)$$

and similarly the signal $s_2$ may be obtained from the voltage $(V_{21} + \Delta V_2)$ appearing on line 202 by $$s_2 = (V_{21} + \Delta V_2) - (V_{21} + V_{21}\zeta_2\beta\Delta t)$$

Accordingly line 200 is connected to the input 206 of a high gain amplifier 208 through an input resistor 210, and a reference signal of opposite polarity on line 212 is also connected to the amplifier input 206 through a rheostat 214. A feedback resistor 216 connects the output 218 of the amplifier to the input 206 thereof so as to maintain the same at substantially zero potential.

The reference signal on line 212 is derived from a voltage source represented by a battery 220, the battery being connected across a voltage divider comprising a rheostat 222 and the temperature compensating resistance 162 in the detector 152. The positive terminal of the battery 220 is grounded (assuming a positive polarity for the signal on line 200) as is one end of resistance 162. The reference signal on line 212 is derived from the junction of rheostat 222 and resistor 162, and comprises the portion of the output of battery 220 which appears across resistor 162. Thus the reference signal is the difference between the voltage output of battery 220 and the voltage drop across rheostat 222. The resistance of rheostat 214 preferably is sufficiently high so that the voltage drop across rheostat 222 caused by current flow in rheostat 214 is negligible. For example, if the temperature compensating resistor 162 has a nominal value of 1000 ohms, rheostat 214 may have a minimum value of several megohms, and the other rheostat 222 is selected and adjusted to have a value of several thousand ohms, so that, as a first approximation, $$\frac{R_{222}}{R_{162}} \approx 1 + \frac{\alpha}{\zeta_1 \beta}$$

where $\alpha$ is the temperature coefficient of resistance of the compensating resistor 162.

The operation of these circuits is similar to the equivalent circuits of FIG. 5, with a difference in that the reference voltage is not constant but varies with the temperature of the fluid 150. Assuming a constant fluid composition, it is apparent that a temperature increase will expand the fluid and reduce its density, so that the radiation penetrating the fluid will increase, and accordingly the voltage on line 200 will increase. In order that the output 218 of the amplifier 208 may be held constant to prevent a false indication of composition change, the reference voltage on line 212 must increase. Accordingly as the fluid temperature increases the resistance of the compensating resistor 162 will increase, reducing the current flow through rheostat 222 and the associated voltage drop thereacross, so that a greater portion of the output voltage of battery 220 becomes available on line 212, as is required.

The signal on line 202 is processed by substantially identical circuitry including an operational amplifier arrangement 230 and a temperature compensated reference voltage source 232. The reference voltage source includes a battery 233, a rheostat 234 and the temperature compensation resistor 164. As a first approximation, rheostat 234 is selected and adjusted so that $$\frac{R_{234}}{R_{164}} \approx 1 + \frac{\alpha}{\zeta_1 \beta}$$

the constant $\zeta_2$ being different from $\zeta_1$ given in the previous case because the relaxation length in the fluid for radiation in the first channel is different from the relaxation length in the same fluid for radiation in the second channel.

The signal $s_2$ is thus obtained at the output 240 of the operational amplifier arrangement 230 in the same way that the signal $s_1$ is obtained on line 218.

Referring to Equation 15, it is assumed that the coefficients of $s_1$ and $s_2$ are such that $\Delta k_1$ is largely a function of $s_1$ with a correction being required for changes in $s_2$. Therefore it is further assumed that Equation 15 may be divided by the coefficient of $s_1$. Accordingly the signal $s_1$ on line 218 is connected directly to a $k_1$ recorder 242. The signal $s_2$ on line 240 is connected across a potentiometer 244 whose setting multiplies $s_2$ by the new coefficient thereof, and the variable tap of the potentiometer is connected to the recorder 242 in opposition to the signal $s_1$. The recorder 242 may be substantially identical with recorder 96 of FIG. 4 above described, having a sensitivity adjustment whereby the difference voltage at the recorder input may be converted to an indicator reading of $k_1$.

In a similar manner an indication of $k_2$ is obtained by connecting line 218 to a second recorder 246 in opposition to a portion of the signal on line 240, which portion is obtained from a potentiometer 248 which divides $s_2$.

It is assumed that in Equation 17 the coefficients of $s_1$ and $s_2$ are such that $\Delta k_3$ is largely a function of $s_2$ with a correction for changes in $s_1$. Accordingly the signal $s_2$ on line 240 is connected to a third recorder 250 in opposition to a portion of $s_1$ which is obtained from a potentiometer 252 which divides $s_1$. The third recorder continuously indicates the value of $k_3$.

In the exemplary apparatus of FIG. 6 the composite fluid 150 is considered to be in the liquid form. However it will be apparent that with suitable modifications, including means for maintaining a constant pressure, the system might be adapted for measurement of gases. Also a system could be constructed wherein the temperature of the measured gases would be thermostatically regulated and wherein pressure changes would be measured and compensated for. Obviously it is also within the scope of this invention to apply both temperature and pressure corrections in the computer system where it is not possible or desirable for either the temperature or the pressure of the measured stream to be maintained constant.

While the invention has been illustrated and described in connection with only a few selected and specific embodiments where it is apparent that the various objects of the invention have been accomplished, such specific embodiments are to be considered illustrative only and not restrictive, since a great many changes and modifications to the disclosed apparatus and described method can be made without departing from the scope of the invention as is set forth in the appended claims.

What is claimed is:

1. A system for analyzing a continuously moving material to determine its variable constituents and physical qualities comprising: means for simultaneously irradiating said material with a beam of beta radiations and a beam of target generated X-radiations, means for simultaneously detecting in a mutually discriminatory manner said radiations penetrating said material, means associated with said detector means for continuously providing a plurality of electrical signals; a computer, means for introducing said signals to said computer, said computer operative to generate a plurality of electrical output signals indicative of the instantaneous value of each of said variables of said material, and utilization means having fed thereto said last named output signals.

2. A system for analyzing a continuously moving material to determine its variable constituents and physical qualities comprising: means for conveying said moving material, means fixedly positioned adjacent said conveying means for simultaneously irradiating said material with a beam of beta radiations and a beam of target generated X-radiations, means also fixedly positioned adjacent said conveying means and in relationship to said irradiating means for simultaneously detecting in a mutually discriminatory manner said radiations penetrating said material, means associated with said detector means for continuously providing a plurality of electrical signals; a computer, means for introducing said signals to said computer, said computer operative to generate a plurality of electrical output signals indicative of the instantaneous value of each said variables of said material, and utilization means having fed thereto said last named output signals.

3. A system for analyzing a continuously moving material to determine certain of its variable constituents and physical qualities comprising: means for conveying said moving material, means fixedly positioned adjacent said conveying means for simultaneously irradiating said material with a plurarlity of radiations having mutually different characteristics, means also fixedly positioned adjacent said conveying means and in relationship to said irradiating means for simultaneously detecting in a mutually discriminating manner said radiations penetrating said material, electrical circuit means connected to said detecting means to provide a plurality of electrical signals, each of said signals varying with the intensity of one of said radiations penetrating said material; a computer having means for receiving each of said signals and means to provide a plurality of electrical output signals indicative of the instantaneous value of each said certain variables of said material, and utilization means having fed thereto said last named output signals.

4. A system substantially as set forth in claim 3 wherein said computer comprises a comparator circuit for each of said certain variables, means for connecting each of said plurality of electrical signals to each of said comparator circuits, and a plurality of indicator means for each output of said comparator circuits to indicate the instantaneous value of each variable.

5. A system for quantitatively analyzing a continuous flow of composite material for the specific constituents and physical qualities thereof, comprising radiation generating means at least including means for generating a first radiation having a first mode of interaction with said material and means for generating a second radiation having a different mode of interaction therewith, said radiation generating means being positioned adjacent one side of said material flow so as to direct said radiations across the path of said flow; signal generating means including a radiation detector positioned on the opposite side of said flow, said signal generator means at least comprising means for generating a first electrical signal dependent on the intensity of said first radiation penetrating said material and means for generating a second electrical signal dependent on the intensity of said second radiation penetrating said material; isolating means at least including means for isolating a component of said first electrical signal and means for isolating a component of said second electrical signal; means for combining all of said component signals to provide an output signal, and a utilization device connected to said output signal.

6. A system as in claim 5 wherein said means for generating said second electrical signal includes a second radiation detector.

7. A system as in claim 5 wherein said first and second radiation generating means consist of a single source of electromagnetic radiation which includes X-radiations and beta radiations as components thereof.

8. A system as in claim 5 wherein said detector comprises means for providing a composite electrical signal dependent on the intensity of both said penetrating radiations, and wherein said first and second electrical signal generating means include means for separating said first and second electrical signals from said composite signal.

9. A system for quantitatively analyzing a continuous flow of composite material for the specific constituents and physical qualities thereof, comprising radiation generating means at least including means for generating a first radiation having a first mode of interaction with said material and means for generating a second radiation having a different mode of interaction therewith, said radiation generating means being positioned adjacent one side of said material flow so as to direct said radiation across the path of said flow; signal generating means including a radiation detector positioned on the opposite side of said flow, said signal generator means at least comprising means for generating a first electrical signal dependent on the intensity of said first radiation penetrating said material and means for generating a second electrical signal dependent on the intensity of said second radiation penetrating said material; isolating means at least including means for isolating a component of said first electrical signal and means for isolating a component of said second electrical signal; each of said isolating means comprising a variable source of a reference signal and means for adding said reference signal to said radiation intensity dependent signal in opposition thereto to provide said component signal which thereby consists of the difference of said added signals; means for combining all of said component signals to provide an output signal, and a utilization device connected to said output signal.

10. A system as in claim 9 wherein said combining means includes adjustable means for algebraically adding an adjusted portion of one of said component signals to the other of said component signals.

11. A system as in claim 9 wherein said material comprises a fluid; wherein said system includes means for confining the cross-sectional dimension of said flow between said radiation generating means and said detector means, and wherein said reference signal source includes automatic means for compensating said reference signal for variations in an environmental condition of the fluid.

References Cited in the file of this patent

UNITED STATES PATENTS

| | | |
|---|---|---|
| 2,431,019 | Barnes | Nov. 18, 1947 |
| 2,534,352 | Herzog | Dec. 19, 1950 |
| 2,642,536 | Heigl | June 16, 1953 |
| 2,666,854 | Hutchins | Jan. 19, 1954 |
| 2,720,594 | Hutchins | Oct. 11, 1955 |
| 2,741,703 | Munday | Apr. 10, 1956 |
| 2,866,899 | Busignies | Dec. 30, 1958 |
| 2,873,377 | McKay | Feb. 10, 1959 |
| 2,897,371 | Hasler | July 28, 1959 |
| 2,920,206 | Heller | Jan. 5, 1960 |
| 2,947,871 | Friedman | Aug. 2, 1960 |

FOREIGN PATENTS

| | | |
|---|---|---|
| 744,311 | Great Britain | Feb. 1, 1956 |